US012385606B2

(12) United States Patent
Katona et al.

(10) Patent No.: US 12,385,606 B2
(45) Date of Patent: Aug. 12, 2025

(54) LINEAR LAMP REPLACEMENT

(71) Applicant: SATCO Products, Inc., Brentwood, NY (US)

(72) Inventors: Thomas M. Katona, San Luis Obispo, CA (US); Steve Paolini, Saratoga, CA (US); Robert Leonard, Newcastle, WA (US); Randall Sosnick, Mill Valley, CA (US); Zach Berkowitz, San Francisco, CA (US)

(73) Assignee: SATCO PRODUCTS, INC., Brentwood, NY (US)

( * ) Notice: Subject to any disclaimer, the term of this patent is extended or adjusted under 35 U.S.C. 154(b) by 92 days.

(21) Appl. No.: 18/372,204

(22) Filed: Sep. 25, 2023

(65) Prior Publication Data

US 2024/0052980 A1 Feb. 15, 2024

Related U.S. Application Data

(63) Continuation of application No. 17/154,109, filed on Jan. 21, 2021, now Pat. No. 11,767,951, which is a (Continued)

(51) Int. Cl.
*F21K 9/27* (2016.01)
*F21K 9/64* (2016.01)
(Continued)

(52) U.S. Cl.
CPC .................. *F21K 9/27* (2016.08); *F21K 9/64* (2016.08); *F21K 9/66* (2016.08); *F21V 3/00* (2013.01);
(Continued)

(58) Field of Classification Search
CPC ..... F21K 9/27; F21K 9/66; F21K 9/64; F21V 29/503; F21V 5/10; F21V 3/00;
(Continued)

(56) References Cited

U.S. PATENT DOCUMENTS 6,513,949 B1 2/2003 Marshall et al.
6,577,073 B2 6/2003 Shimizu et al.
(Continued)

FOREIGN PATENT DOCUMENTS

CN 1392938 A 1/2003
CN 2646554 Y 10/2004
(Continued)

OTHER PUBLICATIONS

International search report and written opinion dated Jan. 29, 2015 for International Application No. PCT/US2014/062716.
(Continued)

*Primary Examiner* — Elmito Breval
*Assistant Examiner* — Hana S Featherly
(74) *Attorney, Agent, or Firm* — WARNER NORCROSS + JUDD LLP

(57) ABSTRACT

A lighting apparatus is provided having one or more light emitting diodes arranged in a row. The light emitting diodes may be supported by an elongated body. The elongated body may comprise an optical element formed from an at least partially optically transmissive material. The lighting apparatus has two ends and may have electrical connectors at the ends.

20 Claims, 3 Drawing Sheets

Related U.S. Application Data continuation of application No. 15/464,265, filed on Mar. 20, 2017, now Pat. No. 10,948,135, which is a continuation of application No. 14/526,328, filed on Oct. 28, 2014, now abandoned.

(60) Provisional application No. 61/903,339, filed on Nov. 12, 2013, provisional application No. 61/896,491, filed on Oct. 28, 2013.

(51) Int. Cl.

| | |
|---|---|
| ***F21K 9/66*** | (2016.01) |
| ***F21V 3/00*** | (2015.01) |
| ***F21V 5/10*** | (2018.01) |
| ***F21V 13/08*** | (2006.01) |
| ***F21V 19/00*** | (2006.01) |
| ***F21V 29/503*** | (2015.01) |
| *F21Y 103/10* | (2016.01) |
| *F21Y 113/13* | (2016.01) |
| *F21Y 115/10* | (2016.01) |

(52) U.S. Cl.
CPC ................ *F21V 5/10* (2018.02); *F21V 13/08* (2013.01); *F21V 19/0045* (2013.01); *F21V 29/503* (2015.01); *F21Y 2103/10* (2016.08); *F21Y 2113/13* (2016.08); *F21Y 2115/10* (2016.08)

(58) Field of Classification Search
CPC .. F21V 13/08; F21V 19/0045; F21Y 2113/13; F21Y 2103/10; F21Y 2115/10
USPC ............................................................ 362/84
See application file for complete search history.

(56) References Cited

U.S. PATENT DOCUMENTS

| | | | | |
|---|---|---|---|---|
| 6,601,970 | B2 | 8/2003 | Ueda et al. | |
| 6,692,136 | B2 | 2/2004 | Marshall et al. | |
| 6,857,767 | B2 | 2/2005 | Matsui et al. | |
| 7,049,761 | B2 | 5/2006 | Timmermans et al. | |
| 7,114,830 | B2 | 10/2006 | Robertson et al. | |
| 7,128,454 | B2 | 10/2006 | Kim et al. | |
| 7,144,131 | B2 | 12/2006 | Rains | |
| 7,213,940 | B1 | 5/2007 | Van De Ven et al. | |
| 7,360,941 | B2 | 4/2008 | Yoon et al. | |
| 7,381,995 | B2 | 6/2008 | Tain et al. | |
| 7,510,299 | B2 | 3/2009 | Timmermans et al. | |
| 7,520,636 | B2 | 4/2009 | Van Der Poel | |
| 7,618,157 | B1 | 11/2009 | Galvez et al. | |
| 7,635,199 | B2 | 12/2009 | Guo et al. | |
| 7,671,936 | B2 | 3/2010 | Chang | |
| 7,726,840 | B2 | 6/2010 | Pearson et al. | |
| 7,731,410 | B2 | 6/2010 | Chu | |
| 7,753,568 | B2 | 7/2010 | Hu et al. | |
| 7,810,951 | B1 | 10/2010 | Lee et al. | |
| 7,819,567 | B2 | 10/2010 | Graham | |
| 7,857,496 | B2 | 12/2010 | Hofmann | |
| 7,887,216 | B2 | 2/2011 | Patrick | |
| 7,929,075 | B2 | 4/2011 | Lee | |
| 7,950,831 | B2 | 5/2011 | Moon | |
| 7,976,196 | B2 | 7/2011 | Ivey et al. | |
| 8,066,414 | B2 | 11/2011 | Pabst et al. | |
| 8,075,159 | B1 | 12/2011 | Tsai | |
| 8,113,680 | B2 | 2/2012 | O'Brien et al. | |
| 8,147,101 | B2 | 4/2012 | Tu et al. | |
| 8,159,631 | B2 | 4/2012 | Hsiao | |
| 8,167,476 | B2 | 5/2012 | Sakamoto et al. | |
| 8,240,877 | B2 * | 8/2012 | Kim | F21V 7/00 362/225 |
| 8,262,249 | B2 | 9/2012 | Hsia et al. | |
| 8,277,081 | B2 | 10/2012 | Song et al. | |
| 8,287,149 | B2 | 10/2012 | Hamada | |
| 8,360,607 | B2 | 1/2013 | Bretschneider et al. | |
| 8,491,165 | B2 | 7/2013 | Bretschneider et al. | |
| 8,684,566 | B2 | 4/2014 | Bretschneider et al. | |
| 8,901,823 | B2 | 12/2014 | Scapa et al. | |
| 10,948,135 | B2 | 3/2021 | Katona et al. | |
| 2003/0227774 | A1 | 12/2003 | Martin et al. | |
| 2004/0233664 | A1 | 11/2004 | Beeson et al. | |
| 2006/0034071 | A1 | 2/2006 | Wang et al. | |
| 2006/0119250 | A1 | 6/2006 | Suehiro et al. | |
| 2007/0133212 | A1 | 6/2007 | Lin et al. | |
| 2007/0139895 | A1 | 6/2007 | Reis et al. | |
| 2007/0189017 | A1 | 8/2007 | Hofmann | |
| 2007/0217192 | A1 | 9/2007 | Hiratsuka | |
| 2007/0274096 | A1 | 11/2007 | Chew et al. | |
| 2008/0062680 | A1 | 3/2008 | Timmermans et al. | |
| 2008/0117627 | A1 | 5/2008 | Lu et al. | |
| 2008/0130285 | A1 | 6/2008 | Negley et al. | |
| 2008/0130299 | A1 | 6/2008 | Dorogi | |
| 2008/0157100 | A1 | 7/2008 | Tan et al. | |
| 2008/0175019 | A1 | 7/2008 | Hacker et al. | |
| 2008/0204888 | A1 | 8/2008 | Kan et al. | |
| 2009/0046471 | A1 | 2/2009 | Devos et al. | |
| 2009/0116223 | A1 | 5/2009 | Hamada | |
| 2009/0159919 | A1 | 6/2009 | Simon et al. | |
| 2009/0161359 | A1 | 6/2009 | Siemiet et al. | |
| 2009/0190348 | A1 | 7/2009 | Lin | |
| 2009/0219713 | A1 | 9/2009 | Siemiet et al. | |
| 2009/0290334 | A1 | 11/2009 | Ivey et al. | |
| 2009/0296384 | A1 | 12/2009 | Van De Ven et al. | |
| 2009/0296394 | A1 | 12/2009 | Wang | |
| 2010/0020532 | A1 | 1/2010 | Negley | |
| 2010/0039815 | A1 | 2/2010 | Jheng | |
| 2010/0110678 | A1 | 5/2010 | Shen et al. | |
| 2010/0124060 | A1 | 5/2010 | Wang | |
| 2010/0149802 | A1 | 6/2010 | Chang | |
| 2010/0220469 | A1 | 9/2010 | Ivey et al. | |
| 2010/0295070 | A1 | 11/2010 | Su et al. | |
| 2011/0038144 | A1 | 2/2011 | Chang | |
| 2011/0176297 | A1 | 7/2011 | Hsia et al. | |
| 2011/0199769 | A1 | 8/2011 | Bretschneider et al. | |
| 2012/0002915 | A1 | 1/2012 | Shiraishi | |
| 2012/0039073 | A1 | 2/2012 | Tong | |
| 2012/0051066 | A1 | 3/2012 | Koo et al. | |
| 2012/0061716 | A1 | 3/2012 | Yu et al. | |
| 2012/0176785 | A1 | 7/2012 | Hsu | |
| 2012/0182713 | A1 | 7/2012 | Bretschneider | |
| 2012/0250350 | A1 | 10/2012 | Kim et al. | |
| 2012/0262902 | A1 | 10/2012 | Pickard et al. | |
| 2012/0306377 | A1 | 12/2012 | Igaki et al. | |
| 2012/0327652 | A1 | 12/2012 | Lee | |
| 2013/0044476 | A1 | 2/2013 | Bretschneider et al. | |
| 2013/0050998 | A1 | 2/2013 | Chu et al. | |
| 2013/0083516 | A1 | 4/2013 | Yoon | |
| 2013/0094200 | A1 | 4/2013 | Dellian et al. | |
| 2013/0221857 | A1 | 8/2013 | Bowers | |
| 2013/0258656 | A1 | 10/2013 | Chin | |
| 2013/0294092 | A1 | 11/2013 | Hussell et al. | |
| 2014/0003027 | A1 | 1/2014 | Bretschneider et al. | |
| 2015/0138752 | A1 | 5/2015 | Katona et al. | |

FOREIGN PATENT DOCUMENTS

| | | | |
|---|---|---|---|
| CN | 201336601 | Y | 10/2009 |
| CN | 101636023 | A | 1/2010 |
| JP | 2008515164 | A | 5/2008 |
| JP | 2009099525 | A | 5/2009 |
| JP | 2010003683 | A | 1/2010 |
| JP | 2012209237 | A | 10/2012 |
| KR | 100919840 | B1 | 9/2009 |
| KR | 100938932 | B1 | 1/2010 |
| KR | 20100101371 | A | 9/2010 |
| KR | 20100129850 | A | 12/2010 |
| TW | 200828617 | A | 7/2008 |
| WO | 2004097291 | A1 | 11/2004 |
| WO | 2007002760 | A3 | 12/2007 |
| WO | 2009111098 | A3 | 10/2009 |
| WO | 2009129689 | A1 | 10/2009 |
| WO | 2009131340 | A2 | 10/2009 |
| WO | 2009140840 | A1 | 11/2009 |

(56) References Cited

FOREIGN PATENT DOCUMENTS

| | | | |
|---|---|---|---|
| WO | 2009140841 | A1 | 11/2009 |
| WO | 2009154321 | A1 | 12/2009 |
| WO | 2009158422 | A1 | 12/2009 |

OTHER PUBLICATIONS

International search report and written opinion dated Feb. 28, 2013 for International Application No. PCT/US2012/051230.
International search report and written opinion dated Aug. 24, 2012 for International Application No. PCT/US2012/020839.
International search report dated Oct. 11, 2001 for International Application No. PCT/US2011/025109.
Kraft, et al. Electroluminescent conjugated polymer seeing polymers in a new light. Angew. Chem. Int. End Engl, 37, 402-428.

* cited by examiner

LINEAR LAMP REPLACEMENT

CROSS-REFERENCE TO RELATED APPLICATIONS

This application is a continuation of U.S. patent application Ser. No. 17/154,109, filed Jan. 21, 2021, which is a continuation of U.S. patent application Ser. No. 14/526,328, filed Oct. 28, 2014, which claims the benefit of U.S. provisional application 61/896,491, filed Oct. 28, 2013, and U.S. provisional application 61/903,339, filed Nov. 12, 2013, the disclosures of which are incorporated by reference in their entirety.

BACKGROUND OF THE INVENTION

Currently, many lighting systems use fluorescent tubes to provide illumination. Fluorescent tubes have lifetimes limited by on/off cycles, a 360 degree light distribution that is not optimal (half goes into the room, half goes toward the ceiling), limited efficacy, and contains mercury. Light emitting diode (LED) solutions can solve many of the challenges faced by fluorescent tubes. However, a common problem with LED solutions is a non-optimal compromise between efficiency and glare. To control glare the common approach is to use a diffuser which can be inefficient. Efficient solutions often orient the LED in direct line of sight to the work surface causing eye discomfort from bright spots of light.

Thus, improved lighting solutions are needed, which can be used to replace fluorescent tube lighting systems.

SUMMARY OF THE INVENTION

Aspects of the invention are directed to a light source made up of light emitting elements attached to a PCB or flex circuit and in contact with a support structure and heat dissipating element, and directed toward at least one partially reflecting reflector and away from the primary direction of the intended illumination. Orienting the LEDs directly opposite the work surface can reduce glare and can reduce or minimize the number of light bounces before exiting the lamp in the direction of the work surface.

The light emitting elements may include one, two or more colors or color temperatures. The support structure can also be an optical element. The heat dissipating element may also be an optical element. The cross-sectional width of the light source may be elliptical-like. The cross-sectional width of the light source can have two distinct widths the larger of the two improves optical efficiency and the smaller of the two provides mechanical and electrical compatibility with T8 size fluorescent lamps or other lamp sizes between T50 and T5.

An aspect of the invention is directed to a lamp comprising: one or more light emitting elements emitting light primarily in a direction that is different from a primary direction of illumination of the lamp; a circuit board upon which the one or more light emitting elements are disposed; and a supporting optical element formed from an at least partially optically transmissive material supporting the circuit board. In some embodiments, light emitting elements (e.g., light-emitting diode (LED) packages, LED chips) can be mounted directly on the supporting optical element, which may be a transparent material such as glass or plastic, that can become a circuit board with the inclusion of conductive interconnects such as indium tin oxide (ITO), metals such as copper, or any conductive material suitable for the power requirements of the application.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF INVENTION

The invention provides systems and methods for providing illumination. A linear replacement light may be provided to replace fluorescent tubes. Various aspects of the invention described herein may be applied to any of the particular applications set forth below or for any other types of lighting configurations. The invention may be applied as a standalone device or method, or as part of an integrated lighting system. It shall be understood that different aspects of the invention can be appreciated individually, collectively, or in combination with each other.

An efficient light source can be desirable for mass adoption in an industrial society. Beyond energy efficiency there are numerous other characteristics that can be desirable in a light source. Descriptions provided elsewhere herein provide examples of desirable characteristics, which are not limiting or exhaustive.

It can be generally desirable to have control over the distribution of optical radiation out of a light source. One or more light emitting elements may be provided as a light source. Most light emitting elements including semiconductor light sources, such as light emitting elements (LEDs), which have an isotropic emission at their genesis. One type of light emitting element which does not have isotropic emission is a laser which has nearly perfect collimation. In many lighting applications, some light distribution other than isotropic light distribution can be desired, although different applications may call for different distributions. In the case of a ceiling mounted luminaire such as a troffer, a primary goal can be to illuminate a work surface such as a desk or table below. Light distribution up toward the ceiling is mostly wasted and cuts into the energy efficiency of a light source. Thus, it may be preferable to use other light distribution arrangements to indirectly illuminate a work surface. Other distributions could include a wall wash application where an asymmetric pattern is desired to illuminate the vertical surface evenly. Another example is a suspended pendant which may also have an asymmetric distribution that sends a portion of the light down and a portion of the light up to partially illuminate the ceiling for aesthetic reasons. Direct side to side emission can result in wasted energy. There are many potential distributions that will need different optical elements or tools to shape the light from its isotropic origins to the desired distribution for the application. Additionally there is often a desire to minimize glare when the light source or light emitting elements are viewed directly or in any manner that allows high density light to enter the eye from any angle. Oftentimes, increased degrees of shaping and glare mitigation can result in a lower efficiency of the optical system.

Figure 1:
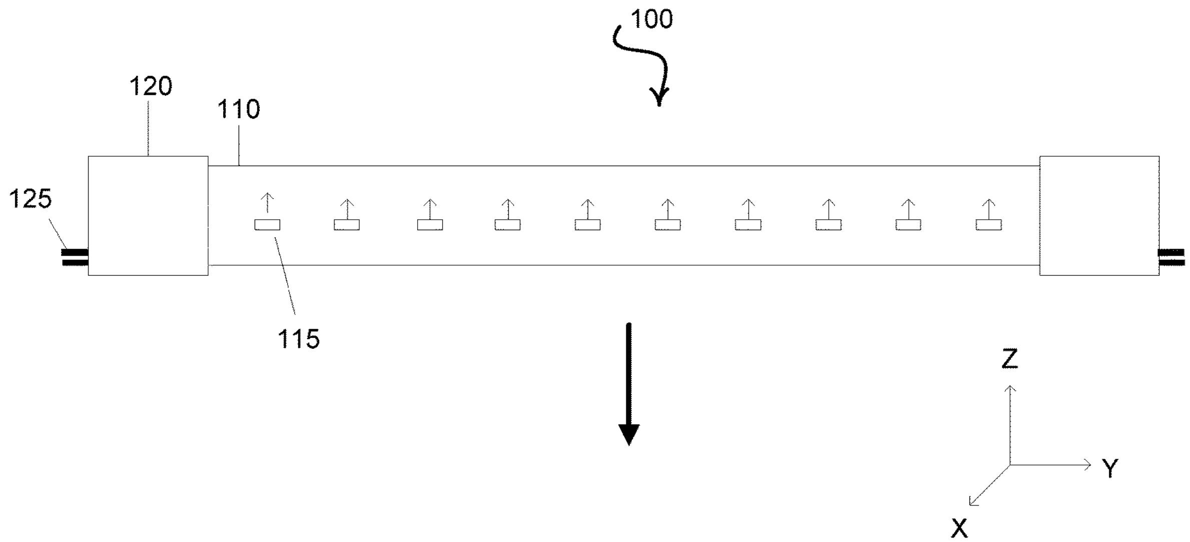
FIG. 1 shows a high level schematic of a lamp, in accordance with an embodiment of the invention.

FIG. 1 shows a high level schematic of a lamp 100, in accordance with an embodiment of the invention. The lamp may be configured to function as a fluorescent tube replacement. The lamp may be used to retrofit an existing fluorescent lighting unit. The lamp may include a body 110 and one, two, or more end caps 120. In some embodiments, the lamp may not include a power supply or a complete optical system that defines the final light distribution into an environment (e.g., room), or may not contain the complete mechanical structure to allow it to attach to a structure (e.g., room, building) in contrast with a luminaire. In some embodiments, a lamp may be smaller than a luminaire, which may have a power supply or ballast, final optics, and mechanical structure to attach to the structure (e.g., room, building). In some other embodiments, the lamp may be a self-ballasted lamp, such as compact fluorescent or LED, or some lamps may be used in configurations that do not require additional optics. In additional embodiments, lamps may be provided without a fixed mechanical structure (e.g., MR16 lamps) that can be hung from wires tensioned across some distance to provide ad hoc mechanical support and electrical connection. In some embodiments, luminaires provide a more complete package as a lighting fixture than a lamp. Lamps may include a pin, screw base, or other male electrical connections that may fit into a socket, while a luminaire may be connected directly to a mains electrical wiring or wall plug. Any description herein of a lamp may also apply to a luminaire.

In one example, the body 110 may be an elongated body. The lamp may be a linear lamp and/or have a linear configuration. The body length to width ratio may be greater than, less than, or equal to about 500:1, 300:1, 200:1, 100:1, 90:1, 80:1, 70:1, 60:1, 50:1, 40:1, 30:1, 20:1, 10:1, 8:1, 7:1, 6:1, 5:1, 4:1, 3:1, 2:1. The body length may be greater than, less than, or equal to about 3 inches, 6 inches, 9 inches, 1 foot, 18 inches, 2 feet, 30 inches, 3 feet, 42 inches, 4 feet, 5 feet, 6 feet, 7 feet, 8 feet, 10 feet, 15 feet, or any other length. The elongated body may include an optical system which may include one or more optical elements. In some embodiments, the optical system may include a window. The optical system may also include reflector, or other optical element as discussed elsewhere herein.

The elongated body may have any shape. In some embodiments, the elongated body may have a semi-cylindrical shape (e.g., with one curved side and one flat site). In other embodiments, the elongated body may have a cylindrical or prismatic shape. In some embodiments, the body sides may be exposed to ambient air. In one example, the flat side and the curved side of a body may be exposed to ambient air. The sides of the body may be exposed without requiring any fins or protrusions on the exterior of the body. Extra external heat dissipating mechanisms may not be required on the body.

The body 110 may have one or more light emitting elements 115. The light emitting elements may have any configuration. For example, the light emitting elements may form one row, two rows, three rows, or more rows, extending along the length of the elongated body. The light emitting elements may form an array or staggered rows. The light emitting elements may have a circular, curved pattern, or other arrangements suitable for the application. The light emitting elements may or may not be evenly spaced apart from one another. In some instances, the light emitting elements may be spaced apart from one another by a distance greater than, less than, or equal to about 1 mm, 3 mm, 5 mm, 7 mm, 1 cm, 1.2 cm, 1.5 cm, 1.7 cm, 2 cm, 2.5 cm, 3 cm, 4 cm, 5 cm, 7 cm, or 10 cm. In some instances, the distance between the light emitting elements may fall between two of the distances described herein. The light emitting elements may be spaced sufficiently far apart to permit heat generated by the light emitting elements to substantially dissipate.

In some instances, the light emitting elements 115 may have a primary direction of illumination. For example, the light emitting elements may be LEDs that are directed in a primary direction. For example, relative to a fixed reference frame, the LEDs may be directed upwards (positive Z direction). The LEDs may be top-emitting LEDs. The primary direction of illumination for the light emitting elements may optionally be different from the primary direction of illumination of the lamp 100. In one example, relative to the fixed reference frame, the lamp may be primarily directing illumination downwards (negative Z direction). The light emitting elements may primarily direct light in a direction opposite the primary direction of illumination of the lamp. Alternatively, the light emitting elements may direct light in a different direction relative to the primary direction of illumination of the lamp (e.g., at an angle greater than, less than, or equal to 15 degrees, 30 degrees, 45 degrees, 60 degrees, 75 degrees, 90 degrees, 105 degrees, 120 degrees, 135 degrees, 150 degrees, 165 degrees, 180 degrees). In some embodiments, the fixed reference frame may correspond to a surface of the environment being illuminated (e.g., Z axis may be substantially orthogonal to a ground, floor, wall, structure, ceiling, ramp, surface). The fixed reference frame reference frame may correspond to the direction of the Earth's gravity (e.g., Z axis may be substantially parallel to the direction of gravity, positive Z direction opposing gravity).

In some instances, the light emitting elements 115 may be partially or completely enclosed within the body 110. The light emitting elements may be surrounded by one or more optical elements. The light emitting elements may be supported by an optical element, such as a window. In some instances, one or more of the optical elements may permit the illumination from the light emitting elements to be redirected to the primary direction of illumination of the lamp 100.

The lamp 100 may include one or more end caps 120 connected to the lamp body 110. The end caps may be mechanically connected to the lamp body. The end caps may be electrically connected to one or more light emitting elements 115. In some instances, the lamp may have two ends, with end caps at each end. The end caps may be at opposing ends of a linear elongated body. In alternative embodiments, the body may be bent, curved, form a U-shape, form a circular shape, branch off into additional ends, form a cross-shape, or any other shape. Any number of end caps may be selected to correspond to the number of ends of provided by the lamp body. The end caps may be configured to mechanically and/or electrically couple the lamp 100 to a conventional fluorescent light receptacle, or any other type of light receptacle. Alternatively, coupling can be achieved without end caps.

The end caps 120 may include one, two or more electrical connectors 125, such as pins, which may permit the lamp to be engaged in a lighting system. Coupling may be achieved, for example, through the use of conductive pins protruding from the end caps, as is used in conventional fluorescent light tube to receptacle coupling schemes. The electrical connectors may or may not be formed from an electrically conductive material. For example, two pins may be provided per end cap. The pins may or may not be parallel. In one embodiment, at least one of the end caps may be used only for mechanical coupling. Alternatively, other electrical connection mechanisms may be utilized. A lighting unit may be slid and/or twisted into a fixture. A lighting unit may be removably attached to a lighting fixture. Alternatively, the lighting unit is not removable from the lighting fixture.

To increase or maximize efficiency, an optical system can be designed to minimize or reduce the number of photon bounces from a light emitting element to exiting the light source. After reducing or minimizing the number of bounces, the surfaces redirecting the light can be of the best quality (e.g., highest or increased reflectivity or transmission) that can be economically applied for a given application. In general the optical tools or elements available include reflectors (e.g., including diffuse and specular), refractors (e.g., lenses including imaging, non-imaging, and Fresnel), diffractors (e.g., including gratings and nano patterns), diffusers (e.g., including bulk and surface), filters (e.g., including high pass, low pass, and notch), and/or light guides (e.g., including flat and curved). A special case of an optical element is a clear window or transparent cover. A window can be "optical" in that it passes visible radiation with little attenuation but does not have optically transformative properties, commonly referred to as secondary optics, that the other aforementioned optical elements have. Optical surfaces may or may not have anti reflective coatings to increase efficiency. These tools or elements can be used alone or in any combination to optimize or improve the performance and cost of the design for the application.

Light emitting elements may produce waste heat to be managed. In the case of vacuum light sources, this waste heat can be mostly radiated away. In the case of solid state light sources, the heat can be mostly conducted away. As solid state light sources are increasingly used in luminaires that were designed for vacuum light sources, one heat management technique may be to first conduct and then radiate or convect the waste heat safely away. Important considerations are the density of the heat source, the number of interfaces, the thermal resistances between the light emitting element and the ambient environment, and the surface area of the structure in contact with the ambient environment. A small reflector lamp such as an MR16 has a much higher heat source density than a four foot linear lamp such as a T8. The following examples are for low heat density linear applications in the range of a T5 to a T50 but should not be considered exclusive of other shapes including high heat density reflector sources. It can be advantageous, in terms of efficiency and/or cost, to reduce or minimize the number of interfaces between light emitting element and ambient environment, and then minimize the thermal resistance of each interface. Air gaps and voids in the thermal path can be avoided as is economically practical.

Figure 2:
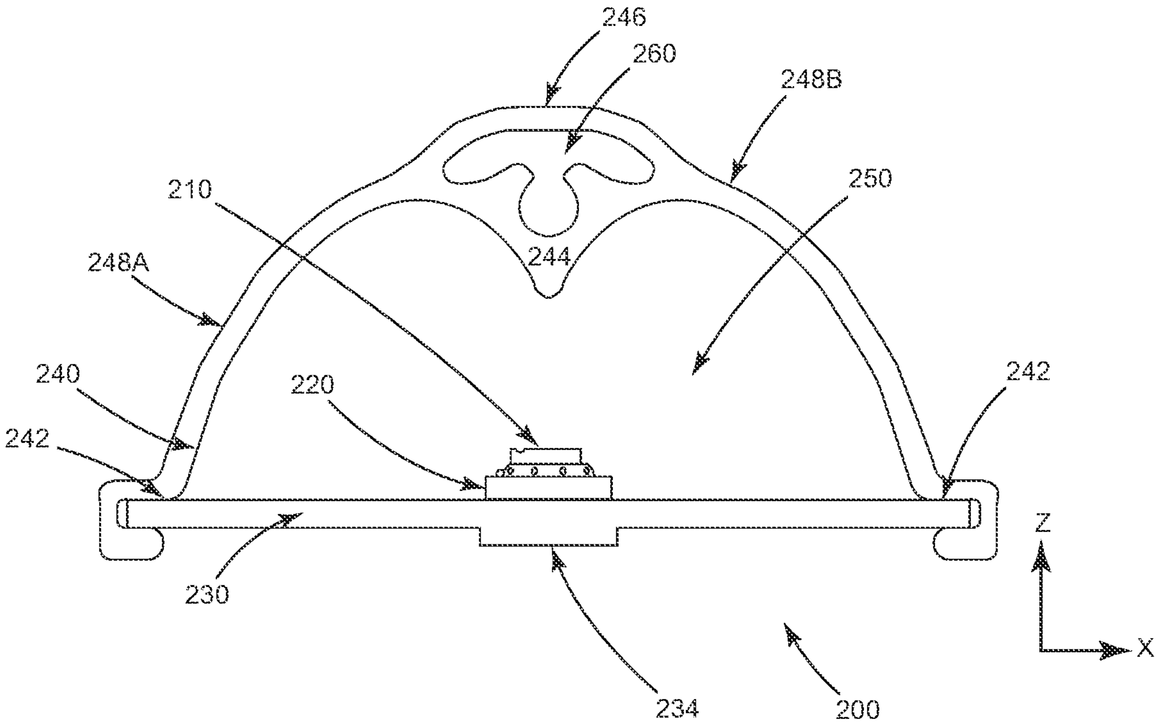
FIG. 2 shows a cross-section of a lamp, in accordance with an embodiment of the invention.

FIG. 2 shows a cross-section of a lamp 200, in accordance with an embodiment of the invention. The lamp may include one or more light emitting elements 210 that may be provided on a circuit board 220. The light emitting element and/or circuit board may be supported by a supporting optical element, such as a window 230. A redirecting optical element 240 may be provided which may redirect or modify the light from the light emitting element. In some embodiments, an internal space 250 may be provided within the lamp. A secondary internal space 260 may also be provided.

The lamp 200 may include one or more light emitting elements 210. The light emitting elements may be any illumination source known in the art. For example, the light emitting elements may include a light emitting diode (LED). A light emitting element may include an LED package. A light emitting element may or may not be a phosphor converted LED. The light emitting element may comprise an LED chip and an encapsulant and/or other lenses or reflectors that function as a primary optics. In some embodiments, a light emitting element may comprise a phosphor proximate to the LED chip configured to convert a portion of the light emitted by the LED chip to a longer wavelength. Alternatively, the light emitting element need not have a phosphor coated thereon. A light emitting element can be formed of a semiconductor material with a primary optic. In some embodiments, a light emitting element may be a point source or substantially point source light emitting element. The light emitting element may provide isotropic light.

In some embodiments, a light emitting element may be a top emitting LED. In other embodiments, a light emitting element may be a side emitting LED or a bottom emitting LED. The light emitting element may direct light in any or multiple directions. In some instances, the light emitting element may have a primary direction of illumination. For example, the primary direction of illumination of a top emitting LED may be the direction of the top face of the LED. Even if light is emitted isotropically, a body or other portion of the light emitting element may block the light in certain directions, so that the light may have a primary direction of illumination.

In alternative embodiments, the light emitting elements may be cold cathode fluorescent lamps (CCFLs) or electroluminescent devices (EL devices). Cold cathode fluorescent lamps may be of the type used for backlighting liquid crystal displays and are described generally in Henry A. Miller, Cold Cathode Fluorescent Lighting, Chemical Publishing Co. (1949) and Shunsuke Kobayashi, LCD Backlights (Wiley Series in Display Technology), Wiley (Jun. 15, 2009), which are hereby incorporated by reference in their entirety. EL devices include high field EL devices, conventional inorganic semiconductor diode devices such as LEDs, or laser diodes, or solid state devices with radiation patterns in between an LED and laser diode such as those that may employ a resonant cavity or photonic lattice, as well as OLEDs (with or without a dopant in the active layer). A dopant refers to a dopant atom (generally a metal) as well as metal complexes and metal-organic compounds as an impurity within the active layer of an EL device. Some of the organic-based EL device layers may not contain dopants. The term EL device excludes incandescent lamps, fluorescent lamps, and electric arcs. EL devices can be categorized as high field EL devices or diode devices and can further be categorized as area emitting EL devices and point source EL devices. Area emitting EL devices include high field EL devices and area emitting OLEDs. Point source devices include inorganic LEDs and top-, bottom-, edge- or side-emitting OLED or LED devices. High field EL devices and applications are generally described in Yoshimasa Ono, Electroluminescent Displays, World Scientific Publishing Company (June 1995), D. R. Vij, Handbook of Electroluminescent Materials, Taylor & Francis (February 2004), and Seizo Miyata, Organic Electroluminescent Materials and Devices, CRC (July 1997), which are hereby incorporated by reference in their entirety. LED devices and applications are generally described in E. Fred Schubert, Light Emitting Diodes, Cambridge University Press (Jun. 9, 2003). OLED devices, materials, and applications are generally described in Kraft et al., Angew. Chem. Int. Ed., 1998, 37, 402-428, and Z., Li and H. Meng, Organic Light-Emitting Materials and Devices (Optical Science and Engineering Series), CRC Taylor & Francis (Sep. 12, 2006), which are hereby incorporated by reference in their entirety.

The light emitting elements can produce light in the visible range (e.g., 380 to 700 nm), the ultraviolet range (e.g., UVA: 315 to 400 nm; UVB: 280 to 315 nm), and/or near infrared light (e.g., 700 to 1000 nm). Visible light may correspond to a wavelength range of approximately 380 to 700 nanometers (nm) and is usually described as a color range of violet through red. The human eye is not capable of seeing radiation with wavelengths substantially outside this visible spectrum such as in the ultraviolet or infrared range, but these wavelengths may be useful for applications other than lighting, such as phototherapy, security, disinfection, communications, plant growth, identification, or inspection applications. Furthermore, ultraviolet light may be down converted by a luminescent material in the lamp. The visible spectrum from shortest to longest wavelength is generally described as violet (approximately 400 to 450 nm), blue (approximately 450 to 490 nm), green (approximately 490 to 560 nm), yellow (approximately 560 to 590 nm), orange (approximately 590 to 620 nm), and red (approximately 620 to 700 nm). White light is a mixture of colors of the visible spectrum that yields a human perception of substantially white light. The light emitting elements can produce a colored light or a visually substantially white light. Various light emitting elements can emit light of a plurality of wavelengths and their emission peaks can be very broad or narrow. In one example, the emission peaks may be greater than, less than, or equal to about 100 nm, 50 nm, 30 nm, 20 nm, 15 nm, 10 nm, 5 nm, or 1 nm. In some examples, the entire wavelength emission range may be greater than, less than, or equal to about 500 nm, 400 nm, 300 nm, 200 nm, 150 nm, 100 nm, 50 nm, 30 nm, 20 nm, 15 nm, 10 nm, 5 nm, or 1 nm. Light emitting elements may be white LEDs or blue LEDs for example. Furthermore, in a single lighting unit, light emitting elements may comprise a combination of colors such as red and white LEDs; red, green and blue LEDs; or red, blue, green, amber (yellow) and white LEDs; or any number of colors needed to best represent the range of spectral power distributions and/or color qualities desired for the application.

A lamp 200 may include light emitting elements 210 that all emit wavelengths within the same range. Alternatively, light emitting elements that emit light in different wavelengths may be used. For example, a circuit board 220 may support one or more color of LEDs.

In some embodiments, it may be desirable for a lighting unit to include both white and red LEDs. In some embodiments, a combination of LEDs may be used to form a white light. In some embodiments, one or more cool white LEDs and one or more red LEDs (e.g., having a wavelength in the range of about 620 to 700 nm) may be provided on a lighting unit. In another embodiment, one or more mint green or greenish white LEDs and one or more red LEDs (e.g., having a wavelength in the range of about 600 to 700 nm) may be provided on a lighting unit. The LEDs having different wavelengths may be alternatingly positioned on the lighting unit. For example, white and red LEDS, or green and red LEDs may be alternatingly positioned along an edge of a circuit board. In other embodiments, groups of white and red LEDS or groups of green and red LEDs may be alternatingly located along an edge of a circuit board. In some embodiments, a lighting unit may include both blue and red LEDs, or blue, white, and red LEDs. In some embodiments, the proportion of white LEDs to red LEDs may be greater than, less than, or equal to about 20:1, 15:1, 10:1, 7:1, 5:1, 3:1, 2:1, 1:1, 1:2, 1:3, 1:5, or 1:10. In some examples, the proportion of white LEDs to red LEDs may fall between about 5:1 and 1:1. The color and proportion of different groups of LEDs may be configured to achieve a desired correlated color temperature (CCT), Duv, color rendering index (CRI), color quality scale (CQS), or other color specifications that may be required to meet Energy Star requirements, for example. Different groups of LEDs may be driven separately to preserve color over lifetime and temperature. Furthermore, separately driving different groups of LEDs may allow color tuning and dimming features. Groups of light emitting elements may or may not comprise light emitting elements of the same color.

There may be a desire to have a choice of the CCT that has a chromaticity close to the black body locus in the range of 2700K to 6500K. However, color temperatures beyond this range and chromaticities well above or below the black body locus can also be desirable. Similarly, the spectral power distribution (SPD) of a black body radiator, while in general of interest, is not the only SPD that is desirable. One example is the SPD of daylight which is generally not shaped like a black body radiator nor is its chromaticity usually located on the locus. Therefore its desirable for a light source to be able to accommodate a wide variation in both SPD and chromaticity as the application dictates while at the same time keeping light source to light source variations at a minimum. While it is common for light sources today to have a fixed CCT and SPD, it is also desirable to have a light source with an adjustable spectrum.

In some embodiments, the light emitting elements with various input spectrums (different colors) can be component parts of the light source. These different colors could be visible in the light source unless additional optical elements or tools are employed. This conspicuous variation of color may be desirable both for aesthetic reasons and efficiency reasons. Other examples of non-black body SPDs include enhancing the blue portion of the spectrum to decrease melatonin and increase wakefulness, enhancing the red portion of the spectrum to allow melatonin to increase naturally to prepare for sleep in humans. Beyond preparing humans for sleep or wakefulness, there are more generally designer spectrums with specific illumination goals that are of commercial interest. For example a spectrum that enhances color contrast for retail product displays of all types or one optimized for product inspections of all types or one that improves worker productivity or student concentration levels. Other examples are spectrums that cause fluorescence. These may be used, for example, to distinguish between a bacterial, fungal, and other infections or medical conditions. These are just some examples and should not limit the scope of designer spectrums. There are also lighting applications beyond human consumption. For example emphasizing the blue and red portions of the spectrum for plants or the spectrum appropriate for health, reproduction, and growth in land, air, and water based animals. Thus, the spectrum for the light emitting elements of the lamp can be selected to provide the desired illumination for various applications.

The lamp may be color-tunable for different applications. In some instances, lamps may be provided with different color spectrum emissions for different applications. In other instances, an individual lamp may be adjustable between different color spectrum emissions for different applications. For example, a user may select a sleep mode to provide an illumination spectrum that gets a human prepared for sleep, or may select a waking mode to provide a different illumination spectrum that keeps a human awake. Similarly, the user may select between different modes for different applications such as a first illumination spectrum for growing plants and a second illumination spectrum for interior lighting for humans. An input region may be provided through which a user may select a mode for a lamp to operate. For example, a switch, button, touchscreen, lever, or other input mode may be provided through which a user may select an operational mode for a lamp, which may dictate the color spectrum and/or intensity emitted by the lamp. Input may also be provided by a personal device, such as a phone or tablet. Input may also be provided by a spectral sensor located to receive daylight.

A lamp 200 may include one or more circuit boards 220. One or more light emitting elements 210 may be provided on the circuit board. The circuit board may be a printed circuit board (PCB) or flex circuit. Any circuit board material known in the art may be used. One, two or more light emitting elements may be provided on a circuit board. Preferably, a plurality of light emitting elements are supported by a circuit board. The circuit board may also support and provide electrical connections to and/or between the light emitting elements. The circuit board may provide an electrical connection between one or more light emitting elements and a power source.

The circuit board may have any shape. For example, a circuit board may be shaped as a rectangle, square, triangle, circle, ellipse, pentagon, hexagon, octagon, u-shaped strip, bent strip, or straight strip. In some embodiments, the circuit board may have a length that is substantially longer than any other dimension of the circuit board (e.g., width, height). For example, the circuit board may have a length to width ratio having a value that is greater than, less than, or equal to the ratios described for the body 110 of the lamp. In some embodiments, the circuit board may have one or more sides. In some embodiments, the circuit board may have a straight side. A circuit board may be flat and/or thin. A circuit board may be a rectangular strip.

Optionally, the circuit board may serve as a structural or support element. The circuit board may or may not serve as a heat dissipating structure. One or more side of the circuit board may contact the light emitting elements, while an opposing side of the circuit board may contact an optical element, such as a supporting optical element 230. Heat dissipation may occur through the side contacting the optical element (e.g., via conduction) and on the side contacting the light emitting elements due to exposure to ambient air in the space 250.

The circuit board may have one, two or more light emitting elements on a surface of the circuit board. The light emitting elements may be positioned on one side of the circuit board, on two side sides of the circuit board, or any number of sides of the circuit board. The light emitting elements may be disposed along the length of the circuit board and may be spaced apart. The light emitting elements may form a row extending along the length of the circuit board. The light emitting elements may have any arrangement, including those described elsewhere herein.

In some embodiments, the circuit board may form a rigid structure. Alternatively, the circuit board may form a flexible structure (e.g., form a flexible PCB). The circuit board may be formed of a thermally conductive material. For example, the circuit board may include aluminum, copper, gold, silver, brass, stainless steel, iron, titanium, nickel, or alloys or combinations thereof. The circuit board can be formed of any thermally conductive and/or heat dissipating material described elsewhere herein. In some examples the circuit board may be an aluminum core circuit board, copper core circuit board, gold core circuit board, silver core circuit board, brass core circuit board, steel-core circuit board, iron core circuit board, titanium core circuit board, nickel core circuit board, alloys thereof, or thermal plastic core circuit board, or have a thermally conductive core of any other material described elsewhere herein. The circuit board may have a thermal conductivity greater than, less than, or equal to about 0.1, 0.5, 1, 2, 3, 5, 10, 20, 30, 40, 50, 60, 70, 80, 90, 100, 120, 150, 175, 200, 250, 300 W/mK.

A circuit board 220 may be flat. The circuit board may be an elongated strip. The circuit boards may be contact and lie flat against a supporting optical element 230. Alternatively, a circuit board may be angled relative to a supporting optical element. In some instances, no gap is provided between the circuit board and the supporting optical element.

In some embodiments, the circuit board may be opaque. Light from a light emitting element may not substantially pass through the circuit board. Alternatively, the circuit board may be translucent or transparent (e.g., formed of glass or plastic). In some embodiments, the circuit board may include one or more conductors. The conductors may be transparent or opaque. In some instances, the conductors of the circuit board may be at least partially optically transmissive. The conductors may be formed from indium tin oxide.

The lamp 200 may have one or more optical element. For example, the lamp may have a supporting optical element 230 and/or a modifying optical element 240. The lamp may have any number of optical elements. For example, the lamp may have a first optical element and a second optical element. In some instances, the supporting optical element may be the first optical element while the modifying optical element may be the second optical element. Additional optical elements (e.g., third optical element, fourth optical element) may be provided.

The first optical element and the second optical element may or may not have different properties. In some embodiments, multiple optical elements may be provided which may share the same or similar features. Any description herein of the first optical element (e.g., supporting optical element) may apply to the second optical element (e.g., modifying optical element), and vice versa. In some embodiments, the lighting unit may have a first optical element as described herein without having a second optical element.

Alternatively, the lighting unit may have an optical element having characteristics of the second optical element described herein without having an optical element with characteristics of the first optical element. The lighting unit may have any number of optical elements (e.g., 1, 2, 3, 4, 5, 6, 7, 8, 9, 10 or more optical elements).

The designation of first, second, third, etc. optical element does not necessarily designate the order in which light is configured to be received by the optical elements. For instance, light from the light emitting elements may be simultaneously received by the first and second optical elements, or light may be redirected by the second optical element to the first optical element.

The optical elements may be configured to provide a desired light distribution. For example, the shape, angle and optical properties of first and second optical elements may be configured such that the standalone lighting unit provides a "batwing" light distribution or other light distribution that is similar to that of a conventional fluorescent tube mounted in a parabolic or other conventional troffer. Alternatively, the optical elements of the lighting unit may be configured such that when the lighting unit is mounted in a parabolic troffer, the light distribution profile matches that of a conventional fluorescent tube mounted in parabolic or other conventional troffer. Alternatively, the optical elements may be configured to provide a concentrated or narrow beam light distribution, or a lambertian emission profile. Optionally, less than lambertian or greater lambertian distribution may be provided. The optical elements may be used to provide wall-washing, or linear track lighting. The ability to tune the beam angle and light distribution using the optical elements is an advantageous feature of this design. Currently available fluorescent tube replacement products have light distribution profiles that do not match that of conventional fluorescent tubes mounted in conventional troffers. The light intensity provided by currently available fluorescent tube replacement lamps at high angles is much less than that of conventional fluorescent tubes in conventional troffers. Thus, for example, to preserve the light distribution profile and uniform intensity across the illuminated floor space, additional troffers would need to be installed if using currently available fluorescent tube replacements lamps.

The systems and methods provided herein may be configured to provide uniform light. The configuration of the lighting unit may enable it to deliver light with little or no pixelation. The light illuminated in a direction of illumination may be continuous. The continuous light may have no pixelation or distinguishable subsections. Indirect lighting configurations as described and/or diffuse reflectors may be used to provide the substantially unpixelated light. Light emitted by multiple light emitting elements may be continuous over an extended region and are not divided into many small sub-sections or pixels that can be independently activated to form an image. In some embodiments, light delivered to an illumination area may not vary substantially over the area. The light intensity over an illumination area may optionally not vary substantially. For instance, the light intensity may not vary by more than 1%, 3%, 5%, 7%, 10%, 12%, 15%, 20%, 25%, or 30% in a primary direction of illumination. In some instances, the illumination may be less than or equal to 0.1, 0.5, 1, 2, 3, 4, or 5 JND (just noticeable difference). Typically, professionals may be able to see about 1 JND, and 3 JND may be considered ok for the general public to not notice or complain. Over an area of 0.1 square meter, 0.5 square meter, 1 square meter, 2 square meters, 3 square meters, 5 square meters, or 10 square meters, the light intensity over any portion of the area may not vary substantially. For instance, the light intensity may not vary by more than 1%, 3%, 5%, 7%, 10%, 12%, 15%, 20%, 25%, or 30% over any of the areas described herein. For instance, the illumination may be less than or equal to about 0.1, 0.5, 1, 2, or 3 JND over any of the areas described herein. Any of the features and elements described herein may be useful for providing non-pixelated light.

An optical element (e.g., first, second, third, etc. optical element) may be a reflector (e.g., diffuse or specular reflector), refractors (e.g., imaging, non-imaging, or Fresnel lens), diffractors (e.g., including gratings and nano patterns), diffusers (e.g., including bulk and surface), filters (e.g., including high pass, low pass, and notch), and/or light guides (e.g., including flat and curved). An optical element may redirect, focus, diffuse, change the wavelength of, absorb, weaken, or have any other effect on light. Optionally, an optical element may be a clear window or transparent cover. A window can pass visible radiation with little attenuation but does not have optically transformative properties. Optical surfaces may or may not have anti reflective coatings to increase efficiency. Optical surfaces may or may not have luminescent materials disposed thereon, as discussed in greater detail elsewhere herein.

An optical element may include portions that may be used for light reflectance, light refraction, and/or light diffraction. An optical element may have a diffuser, a lens, a mirror, optical coatings, dichroic coatings, grating, textured surface, photonic crystal, or a microlens array. The optical element may be any reflective, refractive, or diffractive component, or any combination of reflective, refractive, or diffractive components. For instance, the optical element may be both reflective and refractive.

A lighting unit may have at least one first optical element and at least one second optical element. In some embodiments, a first optical element (e.g., supporting optical element) may be used to support a light emitting element and/or a circuit board upon which the light emitting element is disposed. The first optical element may be proximately located relative to the light emitting elements. In other embodiments, a first optical element may be located downward relative to the second optical element. For instance, the first optical element may be a lower optical element. In some embodiments, emitted light may reach a first optical element after reaching a second optical element. The second optical element may direct light to the first optical element, and vice versa.

In some embodiments, a light emitting element may have primary optics, such as a portion of an LED package. A lighting unit may have one or more secondary optics external to the light emitting element. Secondary optics may shape or modify the light output from a light emitting element. Optionally, the first optical element (e.g., supporting optical element) is not a secondary optic and does not modify light. In some instances, the secondary optical element is a secondary optic and does modify the light (e.g., redirect, diffuse, focus, or change the wavelength of the light). For instance, a light emitting element may comprise a light emitting device and primary optics. For example, a light emitting diode package may comprise a chip and primary optics such as a lens and/or reflectors within the package. There may be 0, 1, 2, 3, 4, or more additional optical elements, which may serve as secondary optics. A first optical element, as described herein, may or may not be a secondary optic. Alternatively, no secondary optics may be provided in the lighting unit. In some embodiments, light emitted from a light emitting element does not pass through secondary optics.

The supporting optical element 230 may be a window. The supporting optical element may be transparent. The window may be a clear pane. The supporting optical element may be substantially optically transmissive. Greater than 95%, 97%, 98%, 99%, 99.5%, 99.7%, 99.9%, 99.99% of the light may pass through the supporting optical element. In some instances, the supporting optical element does not substantially modify the light that encounters and/or passes through the supporting optical element. Alternatively, the supporting optical element may modify the light that it encounters and/or passes through the supporting optical element. For example, the supporting optical element may be a diffuse window. The supporting optical element may be transparent. The supporting optical element may be an optical element of any kind as described elsewhere herein. The supporting optical element may be translucent or transparent. The first optical element may have any color including, but not limited to, white, black, red, blue, green, or yellow.

The supporting optical element 230 may be a window at or near the bottom of a lamp 200. The supporting optical element may be positioned as the surface of the lamp closest to the primary direction of illumination of the lamp (e.g., negative Z direction). Any description of bottom or downward direction may also apply to the primary direction of illumination of the lamp, whether the primary direction of the illumination of the lamp is in the direction of gravity or any other direction relative to gravity. The supporting optical element may be disposed downward of the light emitting element. The supporting optical element may hold the weight of the light emitting element 210 and/or circuit board 220.

The supporting optical element may have a flat surface. The supporting optical element may have a surface contacting the circuit board and an opposing side. Both surfaces may be substantially flat and/or parallel to one another. The supporting optical element may extend along the length of the lamp. The supporting optical element may have an elongated shape. The supporting optical element may form a rectangular pane. Alternatively, other shapes may be provided as a pane with rounded corners, an ellipse, a bent or curved shape, a U shape, a polygon, or other shapes. The ratio of the length of the supporting optical element to the width of the supporting optical element may be high (e.g., any of the ratios of length to width provided elsewhere herein may apply). The supporting optical element may have a smooth surface. The supporting optical element may be formed of, or may include, plastic, glass, metal or any other material. In one example, the supporting optical element may be formed of a plastic with a clear, specular or diffuse surface. The surface of the supporting optical element may be smooth, or may be rough. The surface of the supporting optical element may be flat, curved, or have protruding or recessed features.

The supporting optical element 230 may be formed of a single integral piece. For example, the optical element can be formed of a single transparent or translucent material. Alternatively, the supporting optical element may be formed of a plurality of pieces. A plurality of pieces may be removably or permanently connected. In some instances the supporting optical element may be formed via extrusion as a single integral piece. The supporting optical element may have homogenous material properties. Alternatively, the supporting optical element may have heterogeneous material properties. For example, one or more portion of the supporting optical element may have a higher thermal conduction. The conductive portion 235 of the supporting optical element may be integrally formed with the rest of the supporting optical element. Further characteristics of the supporting optical element and/or the conductive portion are discussed in greater detail elsewhere herein.

The lamp 200 may have one or more modifying optical elements 240. In some embodiments, the modifying optical element 240 may distribute light in a region or regions of desired illumination. The modifying optical element may receive light from one or more light emitting elements 210 and redirect the light to a primary direction of illumination. The light from the modifying optical element may pass through a supporting optical element 230. The light may or may not be further modified as it passes through the supporting optical element. For example, the light may be diffused or collimated as it passes through the supporting optical element. The modifying optical element may be an at least partially reflective reflector. The modifying optical element may be specular or diffuse. The modifying optical element may scatter the light. The modifying optical element may be a specular or diffuse at least partially reflective reflector.

The modifying optical element 240 may extend along the length of a lamp 200. The modifying optical element may have the same length as a supporting optical element 230. When viewed from the Z direction, the modifying optical element may have substantially the same shape as the supporting optical element. The modifying optical element may contact or be coupled to the supporting optical element. In one example, the supporting optical element may be inserted into a receiving portion 242 of the modifying optical element. One or more groove or indentation may be provided into which the edges of the supporting optical element may be inserted. The receiving portion of the modifying optical element may wrap around a side of the supporting optical element and/or a bottom edge of the supporting optical element. The receiving portion may optionally contact a top surface of the supporting optical element, side surface of the supporting optical element, and bottom surface of the supporting optical element.

The supporting optical element 230 may remain in the receiving portion 242 of the modifying optical element 240 by mechanical connection. In some instances, no adhesives or other connection mechanisms may be required. Alternatively, the supporting optical element may connect to the modifying optical element with aid of adhesives, soldering, welding, brazing, melting, fasteners, or other connection mechanisms. The supporting optical element may be removably/separably attached to the modifying optical element. This may provide an individual to access an interior of the lamp. Alternatively the supporting optical element may be permanently affixed to the modifying optical element.

The modifying optical element 240 may be substantially curved or substantially prismatic. The modifying optical element may contact the supporting optical element at an end of the modifying optical element. The modifying optical element may substantially enclose the lamp. For instance, the modifying optical element may at least partially enclose one or more light emitting elements or a circuit board therein.

The modifying optical element may have a light reflecting component, light refracting component, light diffracting component, or a combination thereof. The optical element may have a diffuser, a lens, a mirror, optical coatings, dichroic coatings, grating, textured surface, photonic crystal, or a microlens array, for example. The modifying optical element may have one or more features as previously described for the supporting optical element or any other optical element. Any description herein of the supporting optical element may also apply to the modifying optical element, and vice versa. Furthermore, any description herein of the supporting optical element may apply to the supporting optical element exclusively, the modifying optical element exclusively or both the supporting and modifying optical elements, and vice versa.

The modifying optical element may or may not be fully or partially reflective. In some instances, the modifying optical element may be capable of reflecting at least 30%, 50%, 70%, 80%, 90%, 95%, 97%, 99%, 99.5%, or 99.9% of the light incident thereon.

In another example, the modifying optical element may or may not permit the transmission of light through the modifying optical element. In yet another example, the modifying optical element may comprise cutouts or holes to allow light transmission through the modifying optical element. In some instances, the modifying optical element may be substantially opaque and may or may not include cutouts to permit the transmission of light. Transparent or translucent portions may be provided on an opaque modifying optical element. For example, one or more windows may be provided as a modifying optical element. In a further example, one or more at least partially translucent materials may be used to form the modifying optical element. The one or more translucent materials may be used to form the entirety of the modifying optical element or it may be used to form one or more pieces of the modifying optical element in combination with other materials suitable for forming an optical element in accordance with the present invention. For instance, the modifying optical element may be formed from a translucent plastic. A translucent modifying optical element may provide advantages as described elsewhere herein. For example, in a ceiling fluorescent tube replacement application in accordance with the present invention, light may shine up through the modifying optical element as well as down. A lamp thus configured may closer resemble the light distribution provided by some fluorescent tubes and may eliminate the "black hole" look of some types of LED replacement lamps. The opacity, translucency and/or transparency of the modifying optical element may be selected and/or distributed to form a desired optical effect.

A lamp may have any combination of optical elements with varying optical properties. For example, a lighting unit may have an opaque modifying optical element and a transparent supporting optical element, an opaque modifying optical element and a translucent supporting optical element, a translucent modifying optical element and a transparent supporting optical element, or a translucent modifying optical element and a translucent supporting optical element. Any description of a translucent reflector may also apply to a transparent reflector. A lighting unit may have any combination of opaque, translucent, and/or transparent modifying optical element, with any combination of opaque, translucent, and/or transparent supporting optical element. For example, a lighting unit may have a modifying optical element formed from pieces with opaque and translucent properties and a supporting optical element formed from pieces with transparent and translucent properties.

The modifying optical element 240 may have a shape to provide a desired optical distribution. In one example, the modifying optical element may have a dip 244. The dip may bring a portion of the modifying optical element closer to the light emitting element. The dip may be provided lengthwise along the modifying optical element. The dip may extend along the entire length of the modifying optical element. The dip may overlie one or more light emitting elements 210 and/or circuit board 220. The dip may be parallel to a row of one or more light emitting elements and/or circuit board. In some embodiments, the modifying optical element may have a substantially rounded cross-section, around the light emitting elements, with a dip coming in closer to the light emitting elements. The dip may form a sharp edge, or may form a rounded edge. The cross-section of the modifying optical element with the dip may form a double winged shape. The modifying optical element may be substantially symmetrical about a plane passing through the dip and parallel to the YZ plane of the reference frame.

The shape of the modifying optical element can define the distribution of light from the lamp. Additionally, the curvature or mounting angle of the modifying optical element with respect to the position of the light emitting elements can define the distribution of light from the lighting unit. In some embodiments, the modifying optical element may be shaped to reduce glare. In some embodiments, the modifying optical element may be shaped to provide a diffuse light from the lighting unit. In another example, the modifying optical element may be shaped to provide focused light from the lighting unit. The modifying optical element may be shaped to provide substantially collimated or uniform light from the lighting unit. The modifying optical element may cause light to diverge or be distributed over a wide area. Alternatively, the modifying optical element may cause light to converge or be distributed over a small area. The modifying optical element can cause light to travel in a parallel fashion to an area of distribution. The modifying optical element may direct light in a primary direction, e.g., downwards, sideways, or upwards. In other embodiments, light may be distributed in many directions without requiring a primary direction. For example, light may be distributed downwards and sideways, downwards and upwards, upwards and sideways, or any other combination of directions.

The modifying optical element may be curved. In one example, the second optical element may be curved about an axis extending lengthwise along the optical element. In some embodiments, the second optical element may have only one radius of curvature. Alternatively, the second optical element may have zero, one, two, three, or more radii of curvature. A plurality of curvatures may or may not be provided in different directions. The second optical element may have a concave side and a convex side. The concave side may be directed downwards in a primary direction of illumination. The concave side may face a supporting optical element. In some instances, a dip may be provided which may cause two concave portions to be formed. The two concave portions may form two wings of the modifying optical element. A double-winged or arched structure may be provided by the modifying optical element. The double-winged structure may be formed of two semi-cylindrical or curved shapes.

In one example, the modifying optical element can be a reflective optical element. The reflective optical element can be made of a plastic support with a thin, reflective metallic (e.g., aluminum, or other metal described elsewhere herein) coating evaporated onto the surface that is the side of the plastic support facing the supporting optical element. The curvature of the modifying optical element can be configured to provide a broad distribution of light. Rather than a continuous reflective coating, the modifying optical element can comprise reflective regions on the interior surface of the modifying optical element. In other embodiments, the modifying optical element can be formed from a metal or metal alloy, such as those described elsewhere herein. The reflective regions can be made, for example, by polishing the interior surface of the metallic modifying optical element. The reflective regions can also be made by attaching a thin reflective film via the use of an adhesive or compression/tension, or any combination of techniques described herein. Additionally, the shape or configuration of the modifying optical element can be changed to achieve a different distribution of light. For example, the radius of curvature of the optical element may be reduced in order to achieve a narrower distribution of light. Light directed towards the optical element may experience multiple reflections off of the optical element before being directed towards another optical element and/or exiting the lamp.

The modifying optical element may have a smooth surface, or a surface with grating, diffusers, or other surface features. The modifying optical element may have a surface with any characteristic as described elsewhere herein.

The modifying optical element 240 may optionally have a structural stiffener 246. Alternatively, no structural stiffener may be required. In some instances, the structural stiffener may overlie a portion of the modifying optical element that dips downwards 244. In some instances, the structural stiffener may form a top/outer surface of the modifying optical element. The dip 244 may be provided on an interior portion of the modifying optical element and may not be exposed to the exterior of the lamp. The structural stiffener may have a curved surface. The structural stiffener may form an arch or semi-cylinder along the length of the modifying optical element. The structural stiffener may be a smooth, uninterrupted surface or may have one or more openings or holes. Alternatively, the structural stiffener may have a straight or bent surface. The structural stiffener may connect a top surface of a first wing 248 *a* with a top surface of a second wing 248 *b* of the modifying optical element. A space 260 may be provided between the structural stiffener and the surfaces of the wings where the dip is located. In some embodiments, directly over the light emitting elements, the modifying optical elements may provide two layers. For example, a first inner layer may be provided where the dip is located to provide a desired optical distribution, and a second outer layer may be provided where the structural stiffener is located to provide structural support for the modifying optical element. The structural stiffener may aid in keeping the modifying optical element's shape and preventing sagging or bending.

In some instances, the modifying optical element may be formed from a single integral piece. The structural stiffener, wings, receiving portions, and/or dip portions may be integrally formed as a single piece. The modifying optical element may be formed via extrusion or any other technique. The modifying optical element may be formed from multiple parts permanently or separately attached to one another. The modifying optical element may be formed from a plastic, glass, metal, any combination thereof, or any other material as described elsewhere herein.

In some implementations, the light emitting elements 210 might be packaged white LEDs or chip-on-board (COB) arranged in a linear fashion that point in a direction opposite to the primary direction of illumination of the lamp. For example, if the lamp is primarily directing light downwards, the light emitting elements may be pointed upward. If the lamp is primarily directing light upwards, the light emitting elements may be pointed downward. If the lamp is primarily directly light to a side, the light emitting elements may be pointed to an opposing side. The first optical element that the light encounters could be the modifying optical element 240. In some instances, the modifying optical element may be a substantially hemispherical reflector. The reflector may be diffuse, specular, or a director of some kind. The surface may efficiently redirect the light toward the primary direction of illumination of the lamp. If the modifying optical element is a diffuse reflector, it can minimize or reduce glare inherent in the white LEDs.

In one such configuration the LEDs (chips, packaged, or COB) can be mounted directly onto the supporting optical element 230, which may be transparent, diffuse, or have other optical properties. The LEDs may be electrically interconnected with transparent conductors such as indium tin oxide (ITO) or opaque conductors such as copper, tin, solder, nickel, iron, palladium, silver, or gold, in the form of wires or films (thick or thin). In one example, Noritake or other thick film paste may be used. Optionally, no intermediary separate circuit board structure may be required. In another case the packaged LEDs are mounted on circuit board 220 that is then mounted on the supporting optical element (e.g., window). The shadow cast by the circuit board could be reduced or kept to a minimum for best efficiency and where possible eliminated altogether by direct mounting on the clear window. Since the heat density from the LEDs is low in this case and the surface area of the window is large in comparison, no further heat sink should be required for many applications. If additional heat dissipation is needed, the material directly under the LEDs could be of a higher thermal conductivity 235 in conjunction with the other optical properties of this element. For example a co-extrusion process could combine different materials, one with high thermal conductivity and another with good optical properties into a single element. The LEDs may be in approximately the same plane as the supporting optical element and the supporting optical element may act as a heat sink.

The shape of the roughly hemispherical modifying optical element 240 can be further optimized to improve efficiency and shape light distribution as required for the application. One improvement would be a dip 244 which may be a U- or V-shaped protrusion directly above the LEDs to redirect any light that may bounce directly back into the LEDs into a more favorable direction for illumination. By using other optical tools mentioned above the light can be shaped in any distribution that would be useful for a given application. In addition, the supporting optical element 230 (e.g., window) may be any of the optical tools mentioned above to further shape or diffuse the light as may be required for the application.

Various optical element surfaces may mix the light from different color LEDs if desired. One technique could be to extend the individual light emitting elements in the long axis of the final light source to overlap their distributions. This would be useful in white-only applications to reduce pixelization or in multi-color applications to homogenize the colors. An additional optical element could be added in-between the aforementioned two such as a lens or grating perpendicular to the long axis of the final light source to accomplish this. The lens or grating may extend light emitting from one or more light emitting elements along the length of the lamp. In addition, this additional optical element could be any of the optical tools mentioned above and for purposes other than smoothing out the optical properties of individual light emitting elements (packaged LEDs, chip on board (COB), etc.) mentioned here. Another way to manage the lit appearance of multi color systems is to use multi-color phosphors or other down converter such as quantum dots or multi-color filters on any of the optical elements in a complimentary-color manner to the colors from the light emitting elements. Beyond the optical techniques already mentioned, simply positioning the LED packages or LED chips in a COB closer together and or in multiple rows will improve both white pixelization and color non-uniformity.

Light emitting elements may have a spectral power distribution. The spectral power distribution may have an excess of energy in a particular color portion. For instance, there may be an excess of energy in the cyan portion of the spectrum compared to a thermal radiator. This may enhance wakefulness in humans. The spectral power distribution may have a deficit of energy in a particular color portion. For instance, there may be a deficit of energy in the cyan portion of the spectrum compared to a thermal radiator to promote pre-sleep in humans.

The optical elements may be made of plastic, metal, or other materials with suitable strength, thermal, optical, electrical isolation, and fire resistance as are required for the application. Common materials include metals such as extruded aluminum and folded ferrous sheets, molded or extruded plastics such as acrylic, polycarbonate, and nylon in clear, semi transparent, white or otherwise opaque colors as required for the application. The surfaces may also have macro, micro, and nano features to redirect the light as required for the application.

In some embodiments, the light emitting elements 210 may be placed in a lamp 200 so no direct line of sight is provided to the light emitting elements from the exterior of the lamp. In some instances, the light emitting elements may be at least partially surrounded by a modifying optical element 240. The modifying optical element may optionally be opaque which may prevent a direct line of sight to the light emitting elements. In some instances, the light emitting elements may be disposed on a circuit board 220 which may prevent a direct line of sight to the light emitting elements. In some instances, the direct line of sight to a light emitting surface of the light emitting element may be blocked. For example, if a light emitting element is emitting light from a top surface, the view to the top surface of the light emitting element may be blocked. Optionally, the rest of the light emitting element may or may not be blocked. For example if a view of a top of the light emitting element is blocked from outside the lamp, a view of the bottom of the light emitting element may or may not be blocked. In some instances, a supporting optical element 230 may provide a view into the interior of the lamp. However, the other portions may or may not block a line of sight from the exterior of the lamp to a light emitting element and/or a light emitting portion of the light emitting element. This may prevent glare to a user viewing the lamp from any angle outside the lamp.

In some embodiments, light may be modified by an optical element at least once prior to leaving the lamp. For instance, light may be reflected by the modifying optical element 240 prior to leaving the lamp. In some instances, the light may or may not pass through a diffuser prior to leaving the lamp. In some instances, a supporting optical element 230 may or may not substantially modify the light as it passes through the supporting optical element. The supporting optical element may be at least partially optically transmissive. In some embodiments, the supporting optical element may transmit at least 50%, 70%, 80%, 90%, 95%, 97%, 99%, 99.5%, or 99.9% of the light that interacts with it.

Optionally, one or more surfaces of an optical element may have a luminescent material disposed thereon. For example, a luminescent material can be disposed on a first optical element (e.g., supporting optical element 230) without being disposed on a second optical element (e.g., modifying optical element 240), disposed on a second optical element without being disposed on a first optical element, or may be disposed on both a first optical element and a second optical element. For example, a luminescent material may or may not be disposed on the supporting optical element. The luminescent material may or may not be disposed on a curved modifying optical element. The light emitting elements may be positioned such that light emitted from the light emitting elements is at least partially directed towards the luminescent material. In some embodiments, the luminescent material is not disposed on any optical element. In some instances, the lamp does not include any luminescent material disposed on any surface.

A luminescent material may be disposed on a surface that is not light transmissive. In some embodiments, a luminescent material is not disposed on a transparent or translucent surface. In some embodiments, light is not transmitted through the luminescent material. Alternatively, a luminescent material may be disposed on a light transmissive surface and light may travel through the luminescent material.

A luminescent material may cover an entire surface or a portion of a surface. For example, the luminescent material may cover an entire underside/interior surface of a modifying optical element. In another example, the luminescent material may cover an entire portion of the modifying optical element that may receive light emitted by the light emitting elements. In other instances, one or more parts of the described surfaces may have a luminescent material disposed thereon. The same luminescent material may be provided for all portions of the lighting unit having a luminescent material disposed thereon. Alternatively, different portions of the lighting unit may have different luminescent materials with different properties disposed thereon.

The luminescent material can comprise any material or combination of materials that phosphoresces or fluoresces when excited by light from the light emitting elements. The luminescent material may also comprise the binder, matrix or other material in which the phosphorescent or fluorescent material is dispersed. Any description of a luminescent material may apply to a phosphor or fluorescent material, or any combination thereof. The luminescent material may be a photoluminescent material where absorption of photons may cause re-radiation of photons. The re-radiation may or may not be delayed. The emitted photons may or may not be of lower energy than the absorbed photons. The luminescent material can be an inorganic material, an organic material, or a combination of inorganic and organic materials. The luminescent material can be a quantum-dot based material or nanocrystal. In some embodiments, a luminescent material disposed on a highly reflective material as provided by WhiteOptics LLC may be used.

Numerous luminescent material formulations can be used dependent on the excitation spectra provided by the light emitting elements and the output light characteristics desired. For example, when the light emitting elements provide an emission spectrum yielding white light with a high correlated color temperature, phosphors emitting light of a red and/or orange wavelength can be used to achieve lower/warmer correlated color temperature white light and to improve the color rendering index. A luminescent material can be used to maintain or vary the wavelength of light emitted by the lighting unit. For example, the wavelength of light emitting from a light emitting element may be up-converted or down-converted to a different wavelength by a luminescent material. Alternatively, the luminescent material need not alter the wavelength of light emitted from the light emitting element. Developments in luminescent materials and applications are generally described in Adrian Kitai, Luminescent Materials and Applications, Wiley (May 27, 2008) and Shigeo Shionoya, William Yen, and Hajime Yamamoto, Phosphor Handbook, CRC Press 2nd edition (Dec. 1, 2006), which are hereby incorporated by reference in their entirety.

A remote luminescent material refers to a luminescent material that is not inside or in physical contact with a light emitting element, such as an LED package. For example, a remote phosphor may be a phosphor that does not directly contact a light emitting element. In one example, a remote luminescent material does not contact a primary optic of the light emitting element. One advantage of using a remote luminescent material is that color consistency of a lighting unit product can be enhanced through control of the formulation and deposition of the luminescent material. For instance, when LEDs are fabricated they are binned according to their color characteristics. LEDs from different bins can be used in production of lighting units without sacrificing product to product color consistency if the quantity and formulation of the luminescent material is adjusted depending upon the exact spectral power density provided by LEDs.

Another advantage of using a remote luminescent material is that there may be reduced thermal quenching of the luminescent material because it is physically displaced from the heat generating light emitting element, such as an LED package. Thus, the color of the light is more consistent with lifetime and operating temperature. In comparison, in a luminaire that employs a typical warm white LED, the red and/or orange phosphor material is in direct contact with the LED package and will quench rapidly as the LED is operated at higher temperature resulting in a noticeable shift in color point.

A further advantage of using a remote luminescent material is that to achieve a warmer color temperature, the selection of the luminescent material is not limited only to materials that can operate well at higher temperatures. This can open up a range of materials that are not available to typical LED configurations.

The luminescent material can be disposed on a surface of the lighting unit, such as an optical element, in various ways, including evaporation, spray deposition, sputtering, titration, baking, painting, printing, or other methods known in the art, for example. In some embodiments, the selected surface of the lighting unit may comprise grooves, pockets, or knobs into or onto which the luminescent material is disposed to control the optical distribution of the light emitted by the luminescent material.

In some embodiments, the luminescent material is disposed on a supporting optical element, one or more portion of a circuit board, or any other portion of the lamp.

Optionally, no luminescent materials are provided on a lamp. In some embodiments, only a remote luminescent material may be provided on a lighting unit. For instance, no luminescent material is contacting a light emitting element. Alternatively, a local luminescent material may contact a light emitting element without a remote luminescent material being provided on the lighting unit. Alternatively, both a local and remote luminescent material may be provided for the lighting unit.

In some embodiments, a light emitting element may be directed toward a remote luminescent material. Light may hit a remote luminescent material directly from the source of light. In some embodiments, scattered light may also reach the remote luminescent material. Light may be directed upward to a remote luminescent material. An optical element may be used to direct light to a remote luminescent material. In some embodiments, light may be directed in a different direction from a primary direction of illumination. For example, if a primary direction of illumination is downward, light may be directed upwards, or upwards at an angle.

The lamp 200 may enclose an interior space 250. The one or more optical elements 230, 240 may partially or completely surround the space. In some instances, the space may be completely closed off. The space may or may not be fluid tight (e.g., air tight, liquid tight, hermetically sealed). In some instances, the interior space may contain air that may substantially remain within the lamp without requiring the lamp to be fluid tight.

A second interior space 260 may be provided between surfaces of the modified optical element. The second interior space may be provided between a dip 244 and a structural stiffener 246. The second interior space may have air therein. The interior space may be substantially closed off or enclosed. In some instances, the interior space may be opened at the ends of the modified optical element which may permit air therein to flow. In some instances, air within the second interior space may substantially remain within the space without requiring the lamp to be fluid tight.

In some instances, the interior space 250 and the second interior space 260 are not substantially in fluid communication. The spaces may be fluidically isolated from one another.

The interior space 250 may be illuminated by light from one or more light emitting elements 210. The second interior space 260 may be substantially dark. In some instances, the modifying optical element is substantially opaque which may prevent light from the light emitting elements to reach the second interior space or the structural stiffener 246. In some other embodiments, the modifying optical element may permit some light to pass through, which may permit light to reach the second interior space and/or the structural stiffener.

In some embodiments, the lamp 200 may have a rounded side, and a flat side. In some embodiments, the flat side may face the direction of primary illumination by the lamp. The rounded side and the flat side may be formed of optical elements, such as the modifying optical element 230 and the supporting optical element 240 respectively. In some embodiments, the exterior surfaces of the optical elements may be exposed directly to ambient air. The exterior surfaces of the optical elements may be provided without any fins, protrusions, or extra heat sinks provided thereon. The optical elements themselves may form as heat dissipating structures without needing any additional surface features. The optical elements may serve as a primary source of heat dissipation such that the majority of the heat is dissipated through the optical elements.

Figure 3A:
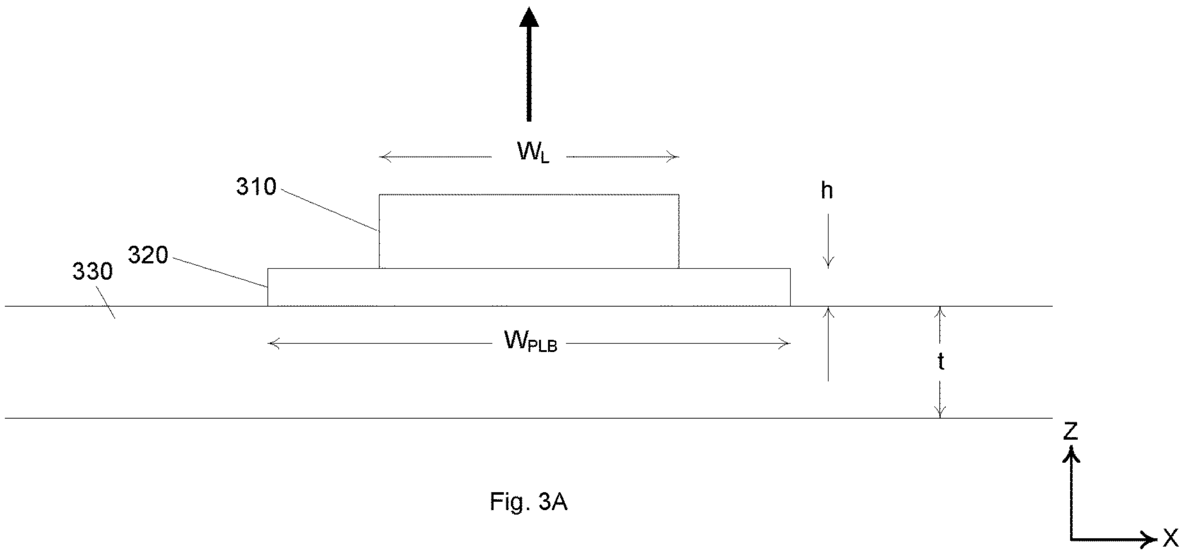
FIGS. 3A-3B shows a light emitting element and supporting structure in accordance with an embodiment of the invention.
Figure 3B:
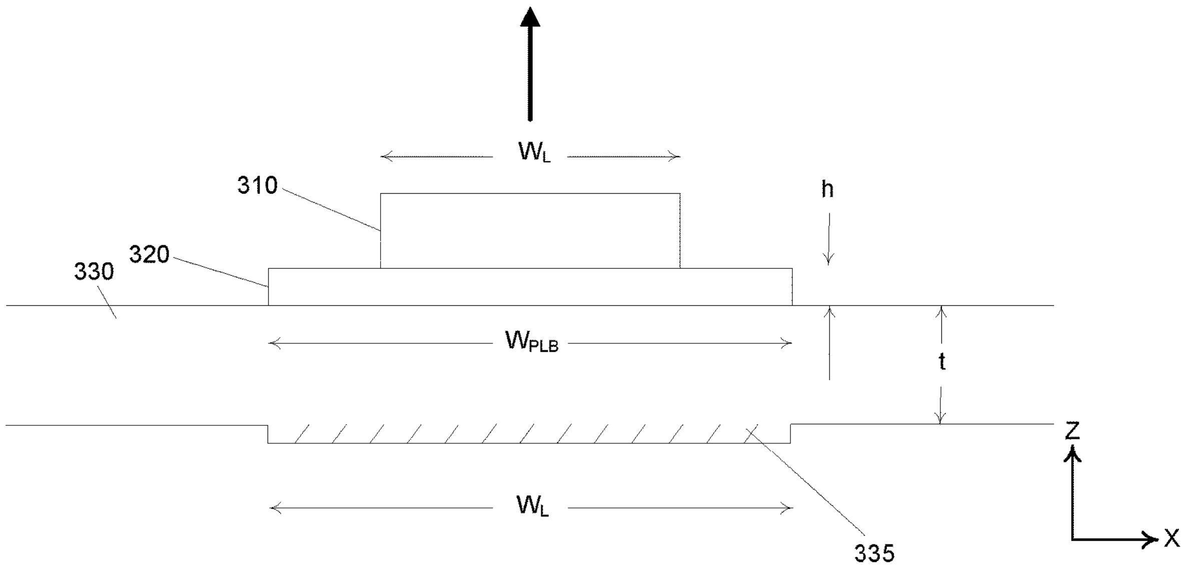

FIGS. 3A-3B shows a light emitting element 310 and supporting structure in accordance with an embodiment of the invention. FIG. 3A shows an example of a light emitting element on a supporting optical element without an extra conductive feature, while FIG. 3B shows an example of a light emitting element on a supporting optical element having an extra conductive feature.

FIG. 3A shows a light emitting element 310 on a circuit board 320, contacting a supporting optical element 330.

The light emitting element may be attached to the circuit board. In some instances, the circuit board may be opaque, translucent, or transparent. The LED may be affixed to the circuit board with aid of an adhesive or any other connection. In some instances, the width of the light emitting element wL may be less than the width of the circuit board wPCB. In other embodiments, wL=WPCB or wL>wPCB.

In some embodiments, the circuit board may have a height h. The height of the circuit board may have any value, such as a value greater than, less than, or equal to about 0.01 mm, 0.05 mm, 0.1 mm, 0.5 mm, 0.7 mm, 1 mm, 1.2, mm, 1.5 mm, 1.7 mm, 2 mm, 2.5 mm, 3 mm, 3.5 mm, 4 mm, 5 mm, 7 mm, or 1 cm. In some embodiments, the side of the circuit board, having height h may have a desired material property. For example, the side of the circuit board may be formed of a reflective material. In some instances, the side of the circuit board may have a white color, or any other color. In some instances, the side of the circuit board may be shiny and/or smooth. The surface of the side of the circuit board may be capable of reflecting substantially greater than about 50%, 70%, 80%, 90%, 95%, 97%, 99%, 99.5%, or 99.9% of light incident thereon. Having a reflective side of the circuit board may improve efficiency of the lamp.

The circuit board 320 may contact a supporting optical element 330. In some instances, the circuit board may be provided on a flat, uninterrupted surface of the supporting optical element. In alternate embodiment, the light emitting element 310 may directly contact the supporting optical element. In some instances, the circuit board may be attached to the supporting optical element with aid of an adhesive. An adhesive tape may be used between the circuit board and supporting optical element (e.g., double sided tape). In some instances, adhesive may be pre-existing on the circuit board or the supporting optical element. Adhesive may be deposited via any technique (including spraying, painting), known in the art on the circuit board or the supporting optical element. In some embodiments, the adhesive may have a high thermal conductivity. The thermal conductivity of adhesive may be at least as great as that of the circuit board and/or the supporting optical element.

The supporting optical element may have a thickness t. The supporting optical element may have the same thickness across the entire supporting optical element. Alternatively, the thickness may vary over the supporting optical element. In some embodiments, the thickness of the supporting optical element may be greater than, less than, and/or equal to about 0.5 mm, 1 mm, 2 mm, 3 mm, 4 mm, 5 mm, 6 mm, 7 mm, 8 mm, 9 mm, 1 cm, 1.2 cm, 1.5 cm, 2 cm, or 3 cm.

The supporting optical element may be at least partially optically transmissive. The supporting optical element may permit at least 50%, 70%, 80%, 90%, 95%, 97%, 99%, 99.5%, 99.9% of the light to pass through. The supporting optical element may be formed of a single integral piece. The light emitting elements and/or the circuit board may be disposed on a surface of the supporting optical element. The light emitting element and/or circuit board may optionally not contact the walls (e.g., formed by a modifying optical element) of the lamp. In some embodiments, the light emitting elements and/or circuit board may be provided on a center portion of the supporting optical element and be substantially equidistant from the receiving portions of the modifying optical element (e.g., where the modifying optical element meets the supporting optical element) of the lamp.

Examples of materials that may be used to formulate any portion of the lamp may include, without limitation, polymers, such as acrylics, polyester (PES), polyethylene terephthalate (PET), polyethylene (PE), high-density polyethylene (HDPE), polyvinyl chloride (PVC), polyvinylidene chloride (PVDC), low-density polyethylene (LDPE), polypropylene (PP), polystyrene (PS), high impact polystyrene (HIPS), polyamides (PA) (Nylons), acrylonitrile butadiene styrene (ABS), polyethylene/Acrylonitrile Butadiene Styrene (PE/ABS), polycarbonate (PC), polycarbonate/Acrylonitrile Butadiene Styrene (PC/ABS), polyurethanes (PU), polyetheretherketone (PEEK), polymethyl methacrylate (PMMA), polytetrafluoroethylene (PTFE), or Urea-formaldehyde (UF). Materials may also include glass, resin, rubber, metals (aluminum, copper, brass, steel, iron, nickel, silver, gold, platinum, titanium) or alloys or combinations thereof. In some embodiments, coatings or films of one material may be provided on another. For example, a plastic may be covered with a reflective metal.

The materials may have any material property. For example, they may have a thermal conductivity greater than, less than, and/or equal to about 0.1, 0.3, 0.5, 1, 1.5, 2, 3, 5, 7, 10, 15, 20, 30, 40, 50, 60, 70, 80, 90, 100, 120, 150, 175, 200, 250, 300, 400, or 500 W/mK. The thermal conductivity of a material may be in a range falling between any two of these values or other values.

Any discussion of the materials and material properties may apply to any component of the lamp. For example, the materials described may be for a modifying optical element, a supporting optical element 330, circuit board 320, or adhesive. In some embodiments, the components may have the same or similar thermal conductivities as one another. In other embodiments, they may have different thermal conductivities. The thermal conductivities of the components may be sufficient to dissipate heat from the light emitting elements 310 without sacrificing a high degree of performance of the light emitting elements.

Heat from light emitting elements 310 may be conducted to a circuit board 320, and to the supporting optical element 330. Heat may dissipate from the light emitting elements, circuit board, and the supporting optical element to the ambient air. Thus, the supporting optical element may serve as both a structural support for the light emitting elements, and a heat dissipating component. The supporting optical element may be used as a primary heat dissipating component to the ambient environment. For example, heat generated by the light emitting elements may be transferred primarily through the supporting optical element. The majority of the heat from the light emitting elements may be transferred to the environment through the supporting optical element. For instance, greater than 50%, 60%, 70%, 80%, 90%, 95%, or 99% of the heat may be dissipated through the supporting optical element. The supporting optical element may also serve as a support that permits at least partial or substantially full optical transmission of light.

FIG. 3B shows a light emitting element 310 on a circuit board 320, contacting a supporting optical element 330 that has a conductive portion 335. In some embodiments, a portion of the supporting optical element may have a higher thermal conductivity than other portions of the supporting optical element. In some embodiments, the higher conductivity portion may be formed from different material as the rest of the supporting optical element. In some embodiments, the optical properties of the higher conductivity portion may be the same as the rest of the supporting optical element, or may be different from the rest of the supporting optical element. In one example, the higher conductivity portion may be opaque or translucent, while the rest of the supporting optical element may be translucent or transparent. In another example, both the higher conductivity portion and the rest of the modifying optical element may be clear. In some embodiments, the optical transmissivity of the higher conductivity portion may be lower than the rest of the supporting optical element.

In some embodiments, a single higher conductivity portion 335 may be provided in the supporting optical element 330. The higher conductivity portion may run along the length of the lamp. The higher conductivity portion may be a strip. The strip may be positioned beneath the light emitting elements 310 and/or the circuit board 320. The strip may have a width wC. In some embodiments, the width of the strip may be greater than a width wL of a light emitting element and/or a width of a circuit board wPCB. Alternatively, the width of the strip may be less than or equal to width of a light emitting element and/or width of a circuit board. In some embodiments, the higher conductivity portion does not substantially interfere with the emission of light from the lamp. Optionally, the higher conductivity portion does not substantially block light transmitted through the supporting optical element.

The circuit board 320, which may be a PCB component, may be formed from a thermal ground plane. A thermal ground plane may be a thin sheet heat pipe where latent heat via phase transition from liquid to vapor may increase effective thermal conductivity to greater than about 50,000 W/mK. This may effectively spread heat from light emitting elements 310 to create an isothermal ground plane pinned to the saturation temperature internal to the ground plane. The heat may then pass through a supporting optical element 330 by way of thermal conduction. The higher conductivity thermal ground plane may run along the length of the lamp. The addition of increased heat spreading from the light emitting element 310 by way of a thermal ground plane formed into a printed circuit board can be combined with an alternate heat conduction pathway integrally formed in the supporting optical element 330.

The higher conductivity portion may protrude from the surface of the supporting optical element. The thickness t of the supporting optical element where the higher conductivity portion is provided may be greater than other portions of the supporting optical element. Alternatively, the higher conductivity portion may not extend out of the surface of the supporting optical element may be provided beneath or integrated within a flat surface of the supporting optical element. The thickness of the supporting optical element where the higher conductivity portion is provided may be the same as other portions of the supporting optical element.

The higher conductivity portion may be formed as a single integral piece with the rest of the supporting optical element. The higher conductivity portion may be extruded with the rest of the supporting optical element. In one example, the supporting optical element may be formed from a plastic, such as acrylic, and the higher conductivity portion may be formed from a higher conductivity plastic, or from a metal.

In some embodiments, a single higher conductivity portion is provided in the supporting optical element. Alternatively, multiple higher conductivity portions may be provided.

Aspects of the invention may be directed to a light source (e.g., lamp) made up of light emitting elements attached to a PCB or flex circuit and in contact with a support structure and heat dissipating element and directed toward at least one partially reflecting reflector and away from the primary direction of the intended illumination. The support structure and heat dissipating element may be a supporting optical element.

The light emitting elements may include at least two colors or color temperatures. The PCB or flex circuit may include a red down converter such as quantum dots to improve system conversion efficiency in the part of the spectrum. The light emitting elements may be chosen to emphasize the blue portion of the spectrum while maintaining a white appearance to decrease the level of melatonin. The light emitting elements may be chosen to emphasize the red portion of the spectrum while maintaining a white appearance to allow melatonin to build up naturally and prepare humans for sleep. The light emitting elements may be chosen to emphasize the portion of the spectrum to improve the health and well being of animals.

The light source may include one or more additional optical elements. At least one additional optical element may extend the apparent size of the light emitting elements in the long axis of the light source to reduce pixelization or improve color mixing. In some embodiments, at least one additional optical element may modify the radiation pattern to an asymmetric pattern suitable for wall washing. The at least partially reflecting reflector may allow some transmission to provide an asymmetric up/down radiation pattern. An additional optical element may be a support structure. An additional optical element may be a heat dissipating element.

In some embodiments, a cross-sectional width of the light source may be hemispherical-like (i.e., not round). In some embodiments, a cross-sectional width of the light source may have two distinct widths the larger of the two improves optical efficiency and the smaller of the two provides mechanical and electrical compatibility with T8 size fluorescent lamps. The light source may have a size range from a T5 to a T50 (i.e., have a diameter falling within a range of ⅝" to 50/8").

A light source may be made up of light emitting elements attached to an optical element that acts as a heat sink.

A light source may be made up of multi color or multi color temperature light emitting elements attached to a PCB or flex circuit and in contact with a support structure and heat dissipating element and directed toward at least one partially reflecting reflector and away from the primary direction of the intended illumination. The light source may use one or more phosphors or other down converter or one or more filters on one or more of the optical elements in a complimentary manner to the multi color or color temperature light emitting elements to homogenize the lit appearance of the light source. The down converter may be local to the light emitting element and/or may contact the light emitting element. In other instances, the down converter may be remote to the light emitting element. For instance, a wavelength down converter may be on a surface that does not contact the light emitting element, or a surface that is some distance away from the light emitting element.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

The invention claimed is:

1. A lamp comprising:

an elongated body coupled to first and second end caps, each of the first and second end caps including first and second electrical connectors, wherein the elongated body includes:

a supporting optical element disposed opposite of a redirecting optical element to define an enclosure for a plurality of light emitting diodes that are supported along an upward-facing surface of the supporting optical element, wherein first and second planar edge portions of the supporting optical element are connected to the redirecting optical element, such that the plurality of light emitting diodes are completely contained within the enclosure, wherein the redirecting optical element includes an at least partially reflective surface disposed opposite of the plurality of light emitting diodes for redirecting light emitted by the plurality of light emitting diodes toward the supporting optical element, wherein the supporting optical element is formed from an at least partially optically transmissive material comprising a phosphor that is configured to convert a portion of light emitted by the plurality of light emitting diodes to a longer wavelength, and wherein a portion of the supporting optical element transfers heat from the plurality of light emitting diodes to an ambient environment.

2. The lamp of claim 1, wherein the plurality of light emitting diodes directly contact the upward-facing surface of the supporting optical element.

3. The lamp of claim 1, further comprising a circuit board disposed between the plurality of light emitting diodes and the upward-facing surface of the supporting optical element.

4. The lamp of claim 1, wherein the plurality of light emitting diodes emit light in a primarily upward direction, toward the redirecting optical element.

5. The lamp of claim 1, wherein the supporting optical element comprises a light diffusing window.

6. The lamp of claim 5, wherein the light diffusing window is comprised of glass or transparent plastic.

7. The lamp of claim 1, wherein the portion of the supporting optical element that transfers heat from the light emitting diodes protrudes downward from the supporting optical element.

8. The lamp of claim 1, wherein the plurality of light emitted diodes are arranged in linear fashion along the upward-facing surface of the supporting optical element.

9. The lamp of claim 1, wherein at least two of the plurality of light emitting diodes are configured to emit a different color temperature with respect to each other.

10. The lamp of claim 1, wherein the supporting optical element includes a structural stiffener.

11. The lamp of claim 10, wherein the structural stiffener forms an exterior surface of the supporting optical element.

12. The lamp of claim 1, wherein the at least partially reflective surface of the redirecting optical element is curved.

13. The lamp of claim 1, wherein the first and second planar edge portions of the supporting optical element are received within respective first and second grooves in downwardly curved portions of the redirecting optical element.

14. The lamp of claim 1, wherein each of the supporting optical element and the redirecting optical element extend in a lengthwise direction of the elongated body.

15. The lamp of claim 1, wherein the redirecting optical element includes a structural stiffener that is disposed vertically above the plurality of light emitting diodes.

16. The lamp of claim 1, wherein the supporting optical element includes a first portion having a higher thermal conductivity than a second portion of the supporting optical element.

17. The lamp of claim 1, wherein the first portion of the supporting optical element is disposed immediately below the plurality of light emitting diodes.

18. The lamp of claim 1, wherein the plurality of light emitting diodes are arranged in a single row along elongated body.

19. The lamp of claim 1, wherein first and second sides of the elongated body are exposed to the ambient environment and are free of exterior fins or protrusions.

20. The lamp of claim 1, wherein the plurality of light emitting diodes are configured to produce light in the visible range, the ultraviolet range, or the near infrared range.

* * * * *